US012309246B2

(12) United States Patent
Vaswani et al.

(10) Patent No.: US 12,309,246 B2
(45) Date of Patent: May 20, 2025

(54) SYSTEMS AND METHOD FOR CHARGING VEHICLES

(71) Applicant: ITRON NETWORKED SOLUTIONS, INC., Liberty Lake, WA (US)

(72) Inventors: Raj Vaswani, Portola Valley, CA (US);
George Flammer, Cupertino, CA (US);
James Pace, San Francisco, CA (US);
Jay Ramasastry, Reno, NV (US);
Donald L. Reeves, III, Pleasanton, CA (US); Brian Matsuo, Mountain View, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 34 days.

(21) Appl. No.: 18/078,763

(22) Filed: Dec. 9, 2022

(65) Prior Publication Data

US 2023/0106789 A1 Apr. 6, 2023

Related U.S. Application Data

(63) Continuation of application No. 13/153,948, filed on Jun. 6, 2011, now Pat. No. 11,528,343, which is a
(Continued)

(51) Int. Cl.
*H04L 69/16* (2022.01)
*G01D 4/00* (2006.01)
(Continued)

(52) U.S. Cl.
CPC ............ *H04L 69/16* (2013.01); *G01D 4/004* (2013.01); *G06Q 10/06* (2013.01); *G06Q 30/04* (2013.01);
(Continued)

(58) Field of Classification Search
None
See application file for complete search history.

(56) References Cited

U.S. PATENT DOCUMENTS 5,548,200 A 8/1996 Nor et al.
5,581,261 A 12/1996 Hickman et al.
(Continued)

FOREIGN PATENT DOCUMENTS

DE 19926206 C2 4/2003
JP 3129955 A 6/1991
(Continued)

OTHER PUBLICATIONS

Chow et al., "A Fast Distributed Network Restoration Algorithm", IEEE, 1993, pp. 261-267.
(Continued)

*Primary Examiner* — Ariel J Yu
(74) *Attorney, Agent, or Firm* — Artegis Law Group, LLP

(57) ABSTRACT

Systems and methods for charging vehicles includes at least one mobile device and a utility network management center ("NMC"). The at least one mobile device is configured as an electronic utility device and includes a network interface card ("NIC"). The at least one mobile device is also associated with a utility billing account and at least one utility commodity meter. The utility NMC is configured to communicate with the at least one mobile device and the at least one utility commodity meter over a network, locate the at least one mobile device, and monitor a state of the at least one utility commodity meter. The utility NMC is also configured to determine a usage of a commodity based on the state of the at least one utility commodity meter and bill the utility billing account associated with the mobile device for the usage of the commodity.

20 Claims, 10 Drawing Sheets

Related U.S. Application Data continuation of application No. 11/796,767, filed on Apr. 30, 2007, now Pat. No. 7,957,322.

(60) Provisional application No. 60/899,328, filed on Feb. 2, 2007.

(51) Int. Cl.

| | | |
|---|---|---|
| *G06Q 10/06* | | (2023.01) |
| *G06Q 30/04* | | (2012.01) |
| *G06Q 50/06* | | (2024.01) |
| *H04L 61/5007* | | (2022.01) |
| *H04L 67/125* | | (2022.01) |
| *H04L 69/167* | | (2022.01) |
| *H04W 8/26* | | (2009.01) |
| *H04W 84/18* | | (2009.01) |
| *H04W 92/02* | | (2009.01) |

(52) U.S. Cl.
CPC ........ *H04L 61/5007* (2022.05); *H04L 67/125* (2013.01); *H04L 69/167* (2013.01); *G06Q 50/06* (2013.01); *H04W 8/26* (2013.01); *H04W 84/18* (2013.01); *H04W 92/02* (2013.01); *Y02B 90/20* (2013.01); *Y04S 20/30* (2013.01); *Y04S 40/18* (2018.05); *Y04S 50/12* (2013.01)

(56) References Cited

U.S. PATENT DOCUMENTS

| | | | |
|---|---|---|---|
| 5,673,252 A | 9/1997 | Johnson et al. | |
| 6,246,677 B1 | 6/2001 | Nap et al. | |
| 6,590,928 B1 | 7/2003 | Haartsen | |
| 6,727,708 B1 | 4/2004 | Dougherty et al. | |
| 6,856,820 B1 | 2/2005 | Kolls | |
| 7,035,257 B2 | 4/2006 | Vafaei | |
| 7,078,828 B2 | 7/2006 | Suzuki | |
| 7,127,328 B2 * | 10/2006 | Ransom | H04L 9/3247 700/286 |
| 7,134,008 B2 | 11/2006 | Dutt et al. | |
| 7,141,321 B2 | 11/2006 | McArthur et al. | |
| 7,271,701 B2 | 9/2007 | Kokubu et al. | |
| 7,295,849 B2 | 11/2007 | Ghabra et al. | |
| 7,379,981 B2 | 5/2008 | Elliott et al. | |
| 7,402,978 B2 | 7/2008 | Pryor | |
| 7,516,106 B2 | 4/2009 | Ehlers et al. | |
| 7,698,075 B2 | 4/2010 | Curry et al. | |
| 2004/0064276 A1 | 4/2004 | Villicana et al. | |
| 2004/0110044 A1 | 6/2004 | McArthur et al. | |
| 2005/0144437 A1 * | 6/2005 | Ransom | G06F 1/28 700/286 |
| 2005/0240540 A1 | 10/2005 | Borleske et al. | |
| 2005/0258942 A1 | 11/2005 | Manasseh et al. | |
| 2005/0270173 A1 | 12/2005 | Boaz | |
| 2006/0031180 A1 * | 2/2006 | Tamarkin | G06Q 50/06 705/412 |
| 2006/0071776 A1 | 4/2006 | White, II et al. | |
| 2006/0089752 A1 | 4/2006 | Voigt | |
| 2006/0248016 A1 | 11/2006 | Ginter et al. | |
| 2006/0258322 A1 | 11/2006 | Conner et al. | |
| 2006/0259447 A1 | 11/2006 | Kings et al. | |
| 2006/0270173 A1 | 11/2006 | Yoshihara et al. | |
| 2008/0039989 A1 * | 2/2008 | Pollack | G06Q 50/06 701/22 |
| 2008/0186202 A1 | 8/2008 | Vaswani et al. | |
| 2008/0187116 A1 | 8/2008 | Reeves et al. | |
| 2008/0189436 A1 | 8/2008 | Vaswani et al. | |
| 2008/0228613 A1 | 9/2008 | Alexander | |
| 2009/0066287 A1 | 3/2009 | Pollack et al. | |
| 2009/0174365 A1 | 7/2009 | Lowenthal et al. | |
| 2009/0177580 A1 | 7/2009 | Lowenthal et al. | |
| 2009/0259603 A1 | 10/2009 | Housh et al. | |
| 2009/0277702 A1 | 11/2009 | Kanada et al. | |
| 2009/0313103 A1 | 12/2009 | Ambrosio et al. | |
| 2010/0017249 A1 | 1/2010 | Fincham et al. | |
| 2010/0103940 A1 | 4/2010 | Van Greunen et al. | |
| 2011/0175569 A1 | 7/2011 | Austin | |

FOREIGN PATENT DOCUMENTS

| | | | | |
|---|---|---|---|---|
| JP | 2000-115393 A | | 4/2000 | |
| JP | 2002-056160 A | | 2/2002 | |
| JP | 2004-274675 A | | 9/2004 | |
| JP | 2004291681 A | * | 10/2004 | |
| JP | 2005-018735 A | | 1/2005 | |
| JP | 2005-107737 A | | 4/2005 | |
| JP | 2005-130137 A | | 5/2005 | |
| JP | 2006-045311 A | | 2/2006 | |
| WO | WO-9854591 A1 | * | 12/1998 | ............ G01R 22/00 |

OTHER PUBLICATIONS

Sridharan et al., "Outage Management Through AMR Systems Using an Intelligent Data Filter", IEEE Transactions on Power Delivery, vol. 16, No. 4, Oct. 2001, pp. 669-675.

Bicknell et al., "Performance Analysis of Fast Distributed Network Restoration Algorithms", 1993, pp. 1596-1600.

Fischer et al., "A General Polling Algorithm Using a Wireless AMR System for Restoration Confirmation", IEEE Transactions on Power Systems, vol. 16, No. 2, May 2001, pp. 312-316.

Document entitled, "Outage Reporting Example" from Schneider Electric, publicly available prior to Apr. 30, 2007, 8 pages.

Harper-Slaboszewicz, Patti., "How to Improve Outage Management", Powermarketers Industry Publications, Jan. 18, 2006, 3 pages.

Zimmerman et al., "Bringing Information Technology to Infrastructure, A Workshop to Develop a Research Agenda", ICIS, Final Report, Jul. 2002, 83 pages.

McGlaun, Shane, "AT&T, Verizon, T-Mobile Team Up on Smartphone Payment System", Daily Tech, Retrieved from Internet Nov. 2, 2011 <URL: http://www.dailytech.com/ATT+Verizon+TMobile+Team+Up+on+Smartphone+Payment+System/article 19229.htm>, Aug. 2, 2010, 2 pages.

Gartner, John, "U.S. Environment Not the Best for Evs", Pike Research Blog, Retrieved from Internet Nov. 2, 2011 <URL: http://www.pikeresearch.com/blog/u-s-environment-notthe-best-for-evs>, May 24, 2010, 6 pages.

Lamonica, Martin, "Networks of electric vehicle charging stations on tap", CNET, <URL: http://www.cnn.com/2010/TECH/Innovation/06/02/cnel.electric.vehicle.charging/>, Retrieved from Internet Nov. 2, 2011, Jun. 2, 2010, 2 pages.

McGlaun, Shane, "GM, Google Join Forces to Add OnStar Features to Android Volt App", Daily Tech, Retrieved from Internet Nov. 2, 2011 <URL: http://www.dailytech.com/GM+Google+Join+Forces+to+Add+OnStar+Features+to+Android+Volt+App/article18403.htm>, May 18, 2010, 1 page.

Flatley, Joseph L., "OnStar announces Mylink smartphone apps, voice-based SMS, Facebook plans", Aol Tech, Retrieved from Internet Nov. 2, 2011 <URL: http://www.engadgel.com/2010/09/15/onstar-announces-mylink-smartphone-apps-voice-based-sms-facebo/>, Sep. 15, 2010, 1 page.

PNNL Smart Charger Controller Information Sheet, Pacific Northwest National Laboratory, Jul. 2009, 3 pages.

Berndtson, Chad, "Cisco Forges Smart Grid Alliance With Power Metering Vendor Itron", CRN, Retrieved from Internet Nov. 2, 2011 <URL: http://www.crn.com/news/networking/227200177/cisco-forges-smart-grid-alliance-with-power-metering-vendor-itron.htm;jsessionid=NCUNUwnzZNRp2vqWqZ6FAA**.ecappj03>, Sep. 1, 2010, 2 pages.

Blanco, Sebastian, "GE unveils new electric car charger, the WattStation", Autoblog, Retrieved from Internet Nov. 1, 2011 <URL: http://green.autoblog.com/2010/07/13/ge-unveils-new-electric-car-charger-the-wattstation-w-video/>, Jul. 13, 2010, 3 pages.

Open Standards, Open Possibilities: Addressing Reliability Through

(56) References Cited

OTHER PUBLICATIONS

Next Generation Utility Information and Control Systems, Frost & Sullivan, Jun. 2006, 16 pages.

* cited by examiner

Operational States

| Device Type | Locate | | | Validate | | | Perpetuate | | | | Total |
|---|---|---|---|---|---|---|---|---|---|---|---|
| | New | Installed | Discovered | Initializing | Init Failed | Initialized | Removed | Maintenance | Optimize | Retired | |
| Meter | - | 2 | - | - | - | - | - | - | - | - | |
| Gateway | - | - | - | - | - | - | - | - | - | - | |
| Total | - | 2 | - | - | - | - | - | - | - | - | |

| Device Type | Operate | | | Perpetuate | | | Total |
|---|---|---|---|---|---|---|---|
| | Active | Inactive | Unreachable | Removed | Maintenance | Optimize | Retired | |
| Meter | 2 | - | - | - | - | - | - | 11 |
| Gateway | 2 | - | - | - | - | - | - | 2 |
| Total | 11 | - | - | - | - | - | - | 13 |

Administrative States

| Device Type | Locate | Operate | | Perpetuate | | | Total |
|---|---|---|---|---|---|---|---|
| | New | Active | Inactive | Maintenance | Optimize | Retired | |
| Meter | - | 11 | - | - | - | - | 11 |
| Gateway | - | 2 | - | - | - | - | 2 |
| Total | - | 13 | - | - | - | - | 13 |

FIG. 10

SYSTEMS AND METHOD FOR CHARGING VEHICLES

RELATED APPLICATIONS

The present application is a continuation of U.S. patent application Ser. No. 13/153,948, filed, Jun. 6, 2011, which is a continuation of U.S. patent application Ser. No. 11/796,767, filed, Apr. 30, 2007, issued as U.S. Pat. No. 7,957,322, which claims the benefit of U.S. Provisional Patent Application No. 60/899,328, filed Feb. 2, 2007, the entire contents of each of which are hereby incorporated by reference.

BACKGROUND

Field of the Various Embodiments

The present disclosure relates to utility networks and, more particularly, to a utility network management system and a method of operating a utility network management system for automated reading of utility meters.

SUMMARY

Utilities currently use a customer information system ("CIS") to keep track of and monitor locations where service can be provided, the utility meter(s) deployed at each location, and the customers billed for service. Among other things, a CIS maintains the business state of customer accounts (e.g., whether service is currently active or not, when a customer will be moving into or out of a location, if the customer's billing account is current, etc.).

CIS typically do not communicate directly with meters because most meters deployed today are not connected to a communications network. Instead, a utility's CIS is often integrated with a work order management system ("WOMS"), which identifies service tickets that need to be performed manually by meter reading and maintenance staff. For example, if a customer moves out of a location and the services are turned off, a service ticket is created to dispatch a meter reader to the location to take a physical reading of the meter, so that the customer's final bill can be generated. Utilities generally have business rules in place that are used to decide whether or not to remove the meter from service or otherwise physically disconnect service. When a new customer moves into a location, the process is repeated to activate the service, so that the customer is only billed for the service provided after the activation date.

For utilities that have deployed automated meter reading ("AMR") systems, the utility's CIS loads data into the AMR system indicating which meters should be read. The AMR system can then generate data for the WOMS, which in turn generates routes that meter readers will travel to collect data through a mobile wireless collection system. Alternatively, the AMR system will communicate with a fixed wireless network, should one be deployed, to collect the data. In both cases, meter read data is normally communicated one-way from the meter to the collector. A data validation process can be employed by the utility to verify that the correct type of data is being read from each meter.

Conventional utility systems typically leave utilities with a variety of manual processes and/or vulnerabilities. For example, "last reads" must be performed manually when a utility turns off service to a specific location. Such systems are generally unable to identify service theft for meters that are deactivated, or alternatively, a "truck roll" must be ordered to remove the meter to prevent theft. Alternatively or in addition, such systems do not perform an up-front verification to determine whether the meter is configured in a manner consistent with the customer's billing practices. Rather, any discrepancies are discovered only after the meter data has been manually reviewed, at which point weeks or months might have passed and revenue will have been lost. Alternatively or in addition, such systems do not provide any real-time indication that meters that have been deployed in an AMR system are actually being read until the missing data is discovered when the bills are generated. With limited time available to generate the bill, a manual meter read is often required, or alternatively, the bill is estimated, which can lead to customer dissatisfaction due to an overestimated or underestimated bill. Alternatively or in addition, such systems do not provide or provide only limited ability to receive real-time alerts indicating potential tampering with the utility's equipment, which might indicate service theft. Or, if such alerts are indicated, they are often difficult to correlate with expected activities happening in the field by utility personnel (e.g. the alert may result in a false positive).

In some embodiments, the utility network management system correlates or helps to correlate knowledge maintained in a CIS regarding the state of customer accounts and/or the state of meters at customer locations (i.e., the "Administrative" state) with the state of a meter at a specific location (i.e., the "Operational" state). The utility network management system can also or alternatively include a flexible mechanism to drive activities consistent with the utility's business practices when states are changed.

The utility network management system can include a utility network management center ("utility NMC") having a state transition mechanism. The state transition mechanism can receive a signal indicating that the status of an account has been changed when an account's service is turned off within a CIS. The state transition mechanism can then note that the meter's administrative state has changed from active to inactive.

In some embodiments, the state transition mechanism then triggers an operational state change to inactive. The act of processing that state change can also or alternatively trigger an on-demand read request of the meter through the network. A successful on-demand read can then allow the meter's operational state to transition to inactive. Otherwise, the read attempt can be retried (either directly or via neighboring meters).

When the status of a meter is changed to inactive, service can be remotely disconnected (if the meter supports that functionality), or alternatively, the meter can be automatically added to an automated read task that reads inactive meters on a regular basis and looks for usage patterns that are not consistent with inactive service (e.g., usage on a daily basis above a predetermined threshold value). Read tasks are performed less frequently for inactive meters than for active meters.

When meters are initially discovered or located by the network and are confirmed to be in operation based upon the administrative state, the meters can be immediately slated or are slated relatively quickly for configuration verification. Data is then retrieved over the network and compared against a billing program or other predetermined and/or expected configuration attributes. If there is a match between what is found versus what was expected, the meter is successfully initialized, and it is then added to an automatic reading schedule. If there is a discrepancy, the discrepancy is noted and can then be resolved through the system's user interface, or alternatively, the discrepancy can be automatically resolved using predetermined business rules, which can be defined by the utility.

Because the utility network management system can be aware of the state of the meter and a billing date, the utility network management system can generate reports of unsuccessful reads in advance of a billing deadline. Trends can also be identified to help identify network-level problems that might require deployment (or re-deployment) of networking infrastructure to address the missed reads.

Alerts can be transmitted in near-real-time through the communications network. Alerts that are generated for devices in a maintenance state can be filtered automatically, eliminating or reducing false positives. The remaining alerts can then be acted upon promptly and with confidence by the utility.

Immediately after or soon after relevant information is received, the utility network management system can provide the appropriate provisioning. In general, conventional systems typically batch changes, resulting in delays that can negatively impact end customers and the utility's bottom line.

In some embodiments, the utility network management system of the present disclosure is designed to handle or accommodate exceptions to the greatest extent possible, minimizing the need for operator intervention. Business rules or protocols can be defined and configured by the utility to implement how exceptions should be programmatically addressed without operator intervention, so that the solution conforms to the utility's existing business practices.

The most significant ongoing cost factors in any large-scale AMI or AMR network are human costs associated with system management. The utility network management system of the present disclosure can provide a method to provision and manage devices that scales not with the number of devices deployed, but instead with the number of business operations the utility performs with the network of devices.

The disclosure presents a system for distributing a commodity through a utility grid. The system includes at least one mobile device and a utility network management center ("NMC"). The at least one mobile device is configured as an electronic utility device and includes a network interface card ("NIC"). The at least one mobile device is also associated with a utility billing account and at least one utility commodity meter. The NMC is configured to communicate with the at least one mobile device and the at least one utility commodity meter over a network, locate the at least one mobile device, and monitor a state of the at least one utility commodity meter. The utility NMC is also configured to determine a usage of the commodity based on the state of the at least one utility commodity meter and bill the utility billing account associated with the mobile device for the usage of the commodity.

The disclosure also presents a system for distributing a commodity through a utility grid. The system including at least at least one network interface card ("NIC") and a utility network management center ("NMC"). The NIC is associated with a transportation device. The transportation device is associated with a utility billing account and is capable of receiving the commodity from the utility grid. The NMC is configured to communicate with the at least one NIC over a network, locate the at least one NIC, and monitor a state of the at least one NIC and the transportation device. The NMC is also configured to determine an amount of the commodity provided to the transportation device and bill the utility billing account associated with the transportation device for the amount of the commodity provided to the transportation device.

The disclosure also presents a method of distributing a commodity through a utility grid. The method includes communicating with at least one transportation device through a utility network, locating the at least one transportation device within the utility network, and distributing an amount of the commodity to the transportation device. The transportation device is associated with a utility billing account. The method also includes monitoring a state of the at least one transportation device, determining the amount of the commodity distributed to the transportation device, and billing the utility billing account associated with the transportation device for the amount of the commodity distributed to the transportation device.

The disclosure also presents a method of distributing a commodity through a utility grid. The method includes communicating with at least one mobile device through a utility network, locating the at least one mobile device within the utility network, and communicating with at least one utility commodity meter through the utility network. The mobile device is associated with a utility billing account. The method also includes monitoring a state of the at least one utility commodity meter and the at least one mobile device, determining a usage of the commodity based on the state of the at least one utility commodity meter, and billing the utility billing account associated with the mobile device for the usage of the commodity.

The disclosure also presents a method of provisioning an electronic utility device associated with distribution pathways of a utility network to operate consistently with the infrastructure guidelines of the utility network and distributing a commodity through a utility grid. The method includes receiving information from the electronic utility device that includes the capabilities of the electronic utility device, identifying a configuration state for the electronic utility device from the received information, and determining whether to configure the electronic utility device based upon the identified configuration state. The received information specifies the configuration state of the electronic utility device.

Other aspects of the disclosure will become apparent by consideration of the detailed description and accompanying drawings.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 10 is table including operational and administrative state data for electronic utility devices and other network infrastructure devices of a utility network management system according to some embodiments of the present disclosure.

DETAILED DESCRIPTION

Figure 1:
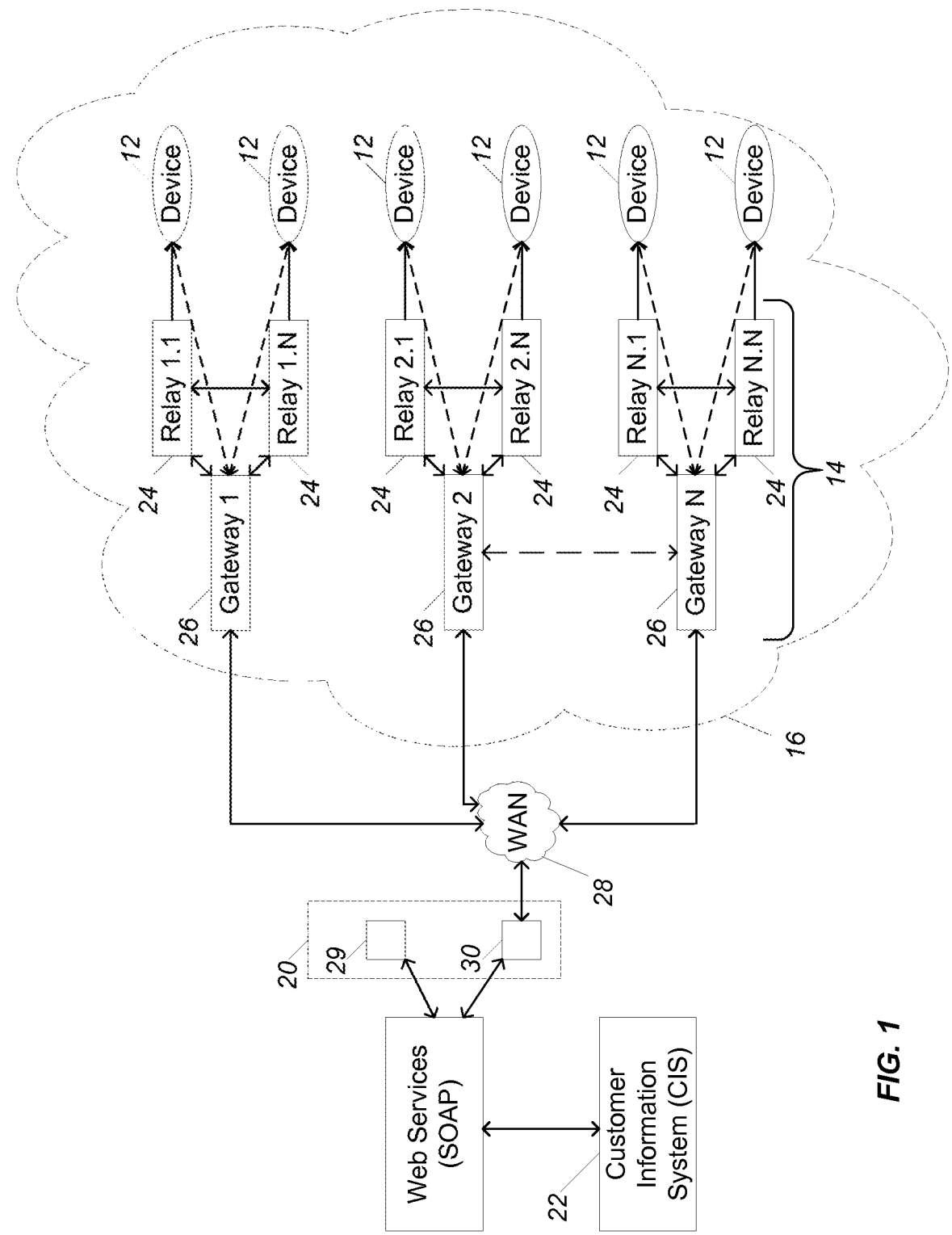
FIG. 1 is a schematic illustration of the utility network management system according to some embodiments of the present disclosure.

Before any embodiments of the disclosure are explained in detail, it is to be understood that the embodiments are not limited in its application to the details of construction and the arrangement of components set forth in the following description or illustrated in the following drawings. The described techniques are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As should be apparent to one of ordinary skill in the art, the systems and networks shown in the figures are models of what actual systems or networks might be like. As noted, many of the modules and logic structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the techniques not limited to the specific examples or terminology or to any specific hardware or software implementation or combination of software or hardware.

FIGS. 1-10 illustrate a utility network management system 10 used for efficient, automated, and/or cost-effective provisioning of a number of electronic utility devices 12 (e.g., utility meters attached to or operating with electrical, gas, water, or other utility grid infrastructure for recording and/or monitoring consumption, in-premise devices, mobile devices, transportation devices (e.g., rechargeable vehicles), etc.) and network infrastructure devices 14 (e.g., nodes, gateway nodes, transmitters, receivers, and/or other devices deployed in the field and located along product distribution pathways of a utility grid or utility network 16 for the purpose of establishing a communication network between a utility's back office and one or more electronic utility devices 12 installed in a service area) in the utility grid 16. The utility network management system 10 includes an end-to-end system and/or components and information flow architecture used to manage a network of electronic utility devices 12 within an AMR network.

A gateway is a device or a network node that performs the function of communicating with a utility network management center 20 ("utility NMC") and a device management system 42 ("DSM") over a wide area network ("WAN"). The gateway can be connected to utility devices 12 over a local area network ("LAN"). In some cases, the electronic utility devices 12 communicate with the gateway via relays or repeaters. As used herein the terms "access point" and "gateway" are used interchangeably.

The electronic utility devices 12 can include a network interface card ("NIC") that enables the electronic utility devices 12 to maintain two-way communications with the NMC 20 via relays and/or gateways. Gateways can execute schedules, collect read data over a network, and/or forward the read data to a utility network management center 20 ("utility NMC") (described in more detail below). Gateways can also function as agents of the utility NMC 20 and can perform network management functions such as route calculation and reachability pings or queries. Relays can be used to extend the reach of a network. In some embodiments, relays are located at high elevations for best line-of-sight to electronic utility devices 12. Several electronic utility devices 12 can be associated with a single relay and several relays can be associated with a gateway. In some embodiments, electronic utility devices 12 can also or alternatively perform some or all of the functions of a relay.

Routes can be network discovered, static, or temporary. A network-discovered route is determined according to a set of rules prescribed by the routing algorithm utilized by a LAN, when a new electronic utility device 12 is set or initialized and the route broadcasts a discovery message across the network 28. A static route is a user-defined route saved and used for subsequent communications. A user-defined static route can override other network-discovered routes. When performing an on-demand ping, a user can specify a one-time route to a destination that is not saved or reused.

As used herein, the term "provisioning" refers to, among other things, a process of discovering or locating electronic utility devices 12 and/or network infrastructure devices 14, validating those electronic utility devices 12 and/or network infrastructure devices 14 on a utility grid infrastructure, configuring each electronic utility device 12 or other network infrastructure device 14 so that it will operate consistently with the utility's infrastructure guidelines, and adding each electronic utility device 12 or other network infrastructure device 14 to an appropriate set of schedule-based tasks such that the electronic utility device 12 or other network infrastructure device 14 can fulfill its role within the utility grid 16 (e.g. so that electronic utility devices 12 can be read and/or can operate within a network). As used herein, the term "flow-through provisioning" refers to or includes, among other things, a process for allowing utilities to manage large numbers of electronic utility devices 12 or groups of electronic utility devices 12 in the utility grid 16. As used herein, the term "flow-through provisioning" can also or alternatively refer to a process for allowing utilities to programmatically manage, without operator intervention, large numbers of network infrastructure devices 14 or groups of network infrastructure devices 14 in the utility grid 16.

Figure 2:
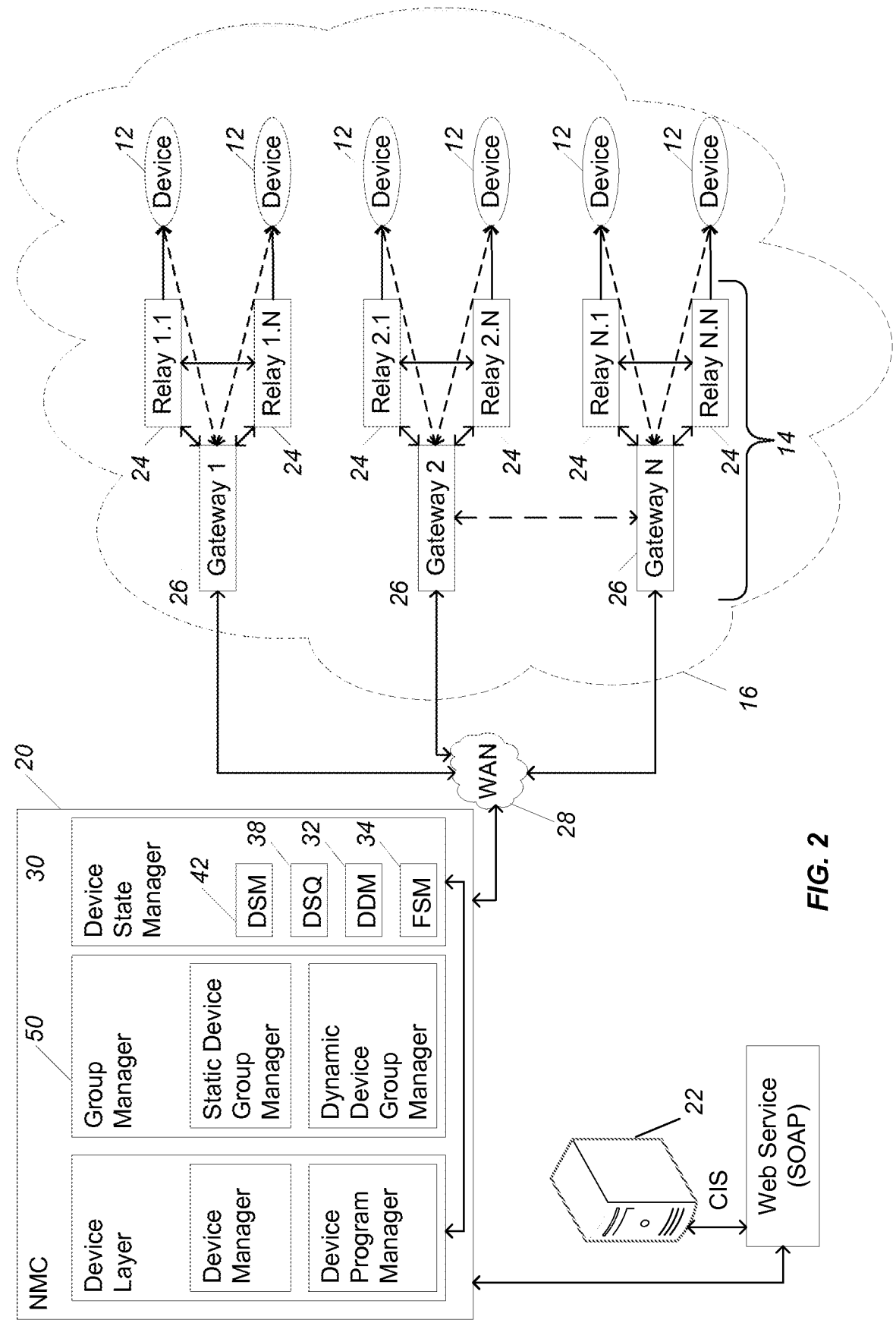
FIG. 2 is a schematic illustration of the utility network management system show in FIG. 1, showing communication between a utility network management center, a customer information system, and a utility grid.

As shown in FIGS. 1 and 2, the utility network management system 10 of the present disclosure can include a utility network management center ("utility NMC") 20 that interfaces with one or more of the network infrastructure devices 14 and/or one or more of the electronic utility devices 12 in the utility grid 16. The utility NMC 20 can perform remote automated meter reading, consumption data gathering and analysis, outage and service restoration management support, and/or other communication functions. The utility NMC 20 can also provide two-way communications between electronic utility devices 12 in remote locations (e.g., customer locations) and a customer information system ("CIS") 22 and can perform flow-through provisioning for some or all of the electronic utility devices 12 and/or the networked infrastructure devices 14 in the utility grid 16. In some embodiments, the electronic utility devices 12 can also be in-premise devices connected to home appliances and utilities, which have two-way communications with the utility NMC 20 via a gateway either directly or via a number or electronic utility devices 12 that are situated outside the premises. In some such embodiments, the in-premise devices are part of a separate utility network.

As shown in FIGS. 1 and 2, the utility NMC 20 and the electronic utility devices 12 can communicate across network infrastructure devices 14 (e.g., relay stations 24 and gateways 26) and over a network 28 (e.g., a wide area network ("WAN")). In other embodiments, the utility NMC 20 can communicate directly with one or more electronic utility devices 12 using other dispersed public or private telecommunications networks and/or local area networks ("LAN"). In still other embodiments, the electronic utility devices 12, the utility NMC 20, and/or the network infrastructure devices 14 include frequency-hopping spread spectrum communication protocol capability, broadband communication capability, IPv4 communication capability, and/or IPv6 communication capability.

As shown in FIGS. 1 and 2, the utility NMC 20 includes a back office device management module 29, which can be operable to perform one or more control and monitoring functions for the electronic utility devices 12, the network infrastructure devices 14, and/or the utility grid 16, and a support module 30, which can also or alternatively perform one or more control and monitoring functions for the electronic utility devices 12, the network infrastructure devices 14, and/or the utility grid 16. In some embodiments, the back office device management module 29 can be a pre-existing system and the support module 30 can be later added to provide additional control and monitoring functions. In some such embodiments, the support module 30 can perform some or all of the functions described below. In other embodiments, the NMC 20 includes a single back office management system, which is operable to perform substantially all control and monitoring functions for the electronic utility devices 12, the network infrastructure devices 14, and/or the utility grid 16. Also, while reference is made herein to a back office system, the NMC 20 and the individual elements of the NMC 20 (e.g., the back office device management module 29 and the support module 30) can have a number of different locations, can be distributed between multiple locations, or can be stored in a single combined location.

During operation of the utility network management system 10, administrative state, meter location, and/or other data are uploaded to the NMC 20 from the CIS 22 using a simple object access protocol ("SOAP"), which sends extensible markup language-formatted ("XML-formatted") requests to a server using hypertext transfer protocol ("HTTP") and receives the response back in XML-format. Because HTTP is a standard and accepted protocol for communication on the Internet and most web servers recognize and respond to HTTP requests, one or more elements of the utility network management system 10 can be integrated relatively easily. In addition, XML is a set of software that enables a user to tag or structure an electronic file so that it can be easily exchanged between various systems. Therefore, the use of XML to send and/or receive messages enables any system on any platform to read and process the messages, unlike proprietary formats. In other embodiments, the utility network management system 10 or elements of the utility network management system 10 can also or alternatively send or receive messages having other formats, which can be proprietary or non-proprietary.

During operation of the utility network management system 10, each electronic utility device 12 in the utility grid 16 is assigned an administrative state, which specifies the business-oriented state of the electronic utility device 12 (e.g., whether utility services are being supplied to the location associated with the electronic utility device 12, the account status associated with the electronic utility device 12, etc.), and an operational state, which specifies the current mode of operation of the electronic utility device 12 (e.g., whether the electronic utility device 12 is operational). In some embodiments, one or more of the network infrastructure devices 14 is also or alternatively assigned an administrative state, which specifies the business-oriented state of the network infrastructure device(s) 14 and an operational state, which specifies the current mode of operation of the network infrastructure device(s) 14. In some embodiments, the utility network management system 10 can have two separate administrative states with one administrative state for the network and the other administrative state for the account status.

As shown in FIG. 2, the NMC 20 can include a device state manager 30, which manages, maintains, and drives the operational state of an electronic utility device 12 and/or a network infrastructure device 14 through changes to the administrative state and/or other external inputs. The device state manager 30 can include a device data module 32 ("DDM"), a finite state machine 34 ("FSM"), a device state queue 38 ("DSQ"), and a device state monitor 42 ("DSM").

The device state manager 30 and the functions performed by the device state manager 30 can be included in the back office management device management module 29 and/or the support module 30. Accordingly, in some embodiments, the back office device management module 29 and the support module 30 can each include one or all of the DDM 32, FSM 34, DSQ 38, and DSM 42.

The DDM 32 is a database schema that maintains attributes of some or all of the electronic utility devices 12 on the utility grid 16, such as, for example, administrative and operational states, whether the electronic utility devices 12 have been initialized, status as an element of the communication network 28, physical location, and other operational attributes. The DDM 32 can also or alternatively maintain attributes of some or all of the network infrastructure devices 14.

The FSM 34 is a business logic program that manages the transition between operational states for a single electronic utility device 12 or a single network infrastructure device 14 in a manner that is consistent with a specified administrative state. The DSQ 38 is a persistent queue of records with each record defining a state transition for a single electronic utility device 12 or a single network infrastructure device 14.

In some embodiments, the utility network management system 10 can include an integrated network-centered system and a finite state machine FSM 34 that can manage the transition of any device in the utility grid 16 between operational states that are consistent with the specified administrative state, as well as provide instant or near-instant visibility into both states of each device.

The DSM 42 is a software module that processes DSQ 38 records and implements the business functionality required when an electronic utility device 12 undergoes any operational state change and/or when a network infrastructure device 14 undergoes any operational state change. Together, the DDM 32, FSM 34, DSQ 38, and DSM 42 perform a device state management function for some or all of the electronic utility devices 12 on the utility grid 16 and/or some or all of the network infrastructure devices 14 on the utility grid 16.

Figure 3:
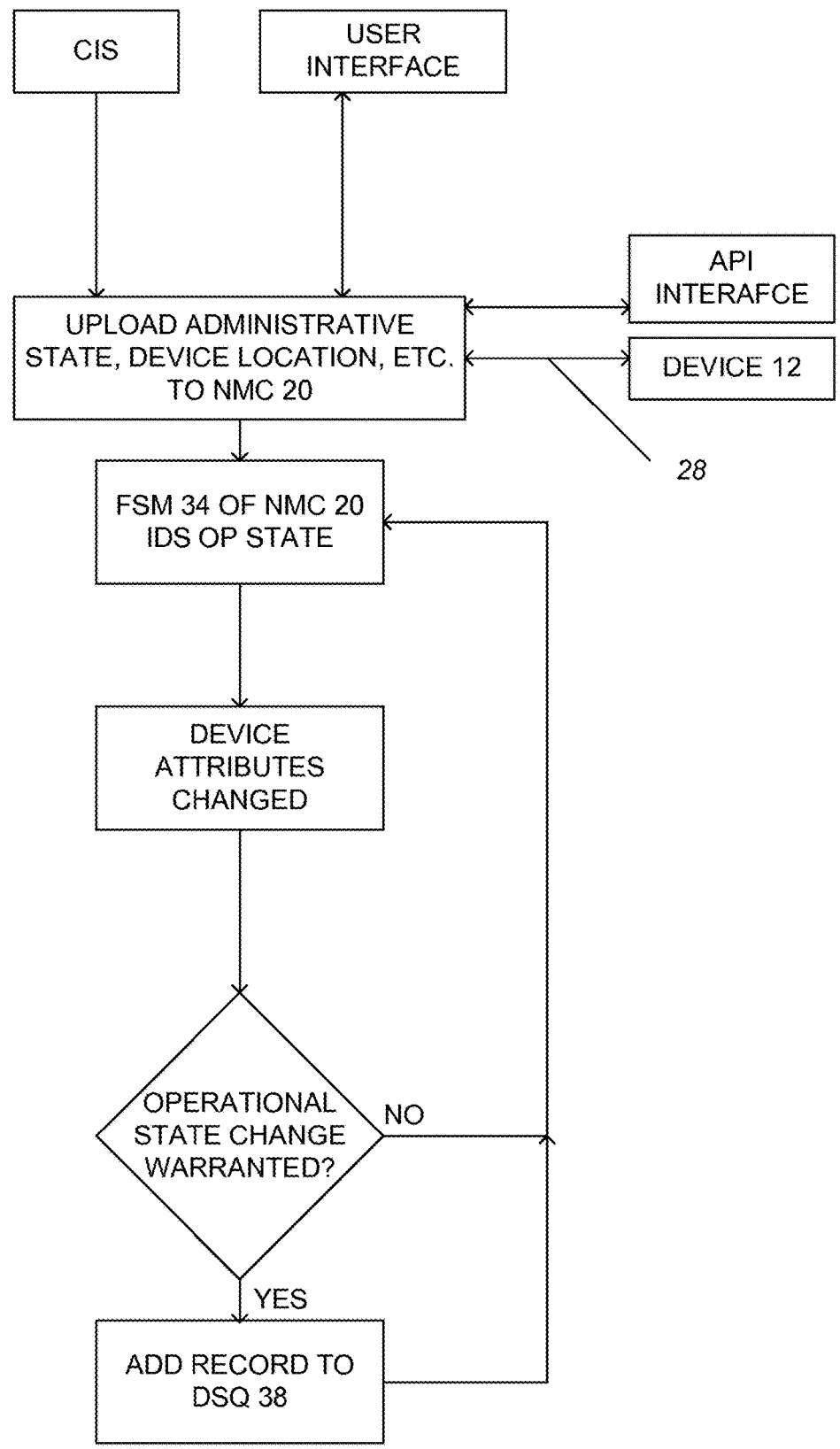
FIGS. 3-9 are schematic illustrations of methods of meter provisioning according to some embodiments of the present disclosure.

Device attributes, stored in the DDM 32, are updated via SOAP-based application program interfaces ("APIs") (e.g., routines, protocols, and/or tools for building or maintaining software applications) or directly through a user interface. As shown in FIG. 3, the administrative state of an electronic utility device 12 or a group of electronic utility devices 12 can be updated using an API interface and/or a user interface. Historical and exception-type information is also maintained in the DDM 32 and is made available to operators and other elements of the utility network management system 10 through the API and user interfaces.

In some embodiments, an operator and other components or elements of the utility management system 10 (e.g., an outage management system) can access the inner workings of the DSM set of components through APIs and the user interface. The operator can also or alternatively access the current states and/or historical transitions that have transpired. Events are also generated by the DSM 42 when exceptions occur during the state transition process, so that an operator can understand what happened within the utility grid 16.

As shown in FIG. 3, changes to the attributes of an electronic utility device 12 or a network infrastructure device 14 will trigger the FSM 34 and cause the FSM 34 to determine whether a state change is warranted. If a state change is warranted, a record is added to the DSQ 38 for asynchronous processing by the DSM 42. The DSM 42 retrieves each record from the DSQ 38 and processes it according to business rules that are either hard-coded into the utility NMC 20, driven by the capabilities of the electronic utility device 12 or network infrastructure device 14 being referenced, or specified by the utility.

The asynchronous nature of the DSM 42 allows the utility NMC 20 to scale, as at any point in time there can be a deluge of device attribute changes that will cause the FSM 34 to make changes. If processing were done in a synchronous manner, the entire utility grid 16 or a substantial portion of the utility grid 16 could be brought to a halt while performing the work required for each state transition, many of which require round-trip messages to be exchanged between two or more elements of the utility grid 16. Instead, the DSM 42 works in the background, processing changes as quickly as possible, but higher priority work can flow through the system in parallel. Further, in some embodiments, the process can be interrupted and resumed with serial time- and task-completion stamps.

In some embodiments, the utility network management system 10 can include two or more DSMs 42 to ensure that the utility network management system 10 will continue to function if one DSM 42 fails. This deployment topology is facilitated by the very nature of the DSQ 38, which persists in the database. Records can be retrieved from the DSQ 38 in batches and processed by a single DSM 42. As the records are retrieved from the DSQ 38, the record can be updated with a timestamp to reflect that work is in progress. Additional DSM 42 processes can retrieve records from the DSQ 38 and process those records in parallel or at the same time.

In embodiments of the utility network management system 10 having multiple DSMs 42, the DSQ 38 can include a timeout mechanism that will make records available again to an alternate DSM 42 if the records are not marked as completed within a configurable timeframe (i.e., if the DSM 42 assigned to a project fails). In this manner, all items within the DSQ 38 are made available for processing as long as a single DSM 42 remains functioning. Embodiments of the utility network management system 10 having multiple DSMs 42 can be highly available (i.e., such systems can continue to function when one or more components fail).

During operation and as shown in FIGS. 2 and 3, the finite state machine ("FSM") 34 of the utility NMC 20 can use uploaded data to identify a new operational state of an electronic utility device 12 or a network infrastructure device 14, if any, based on the new administrative state. Alternatively or in addition, the FSM 34 can add a record onto the DSQ 38 for asynchronous processing, to take action on the new operational state.

Figure 4:
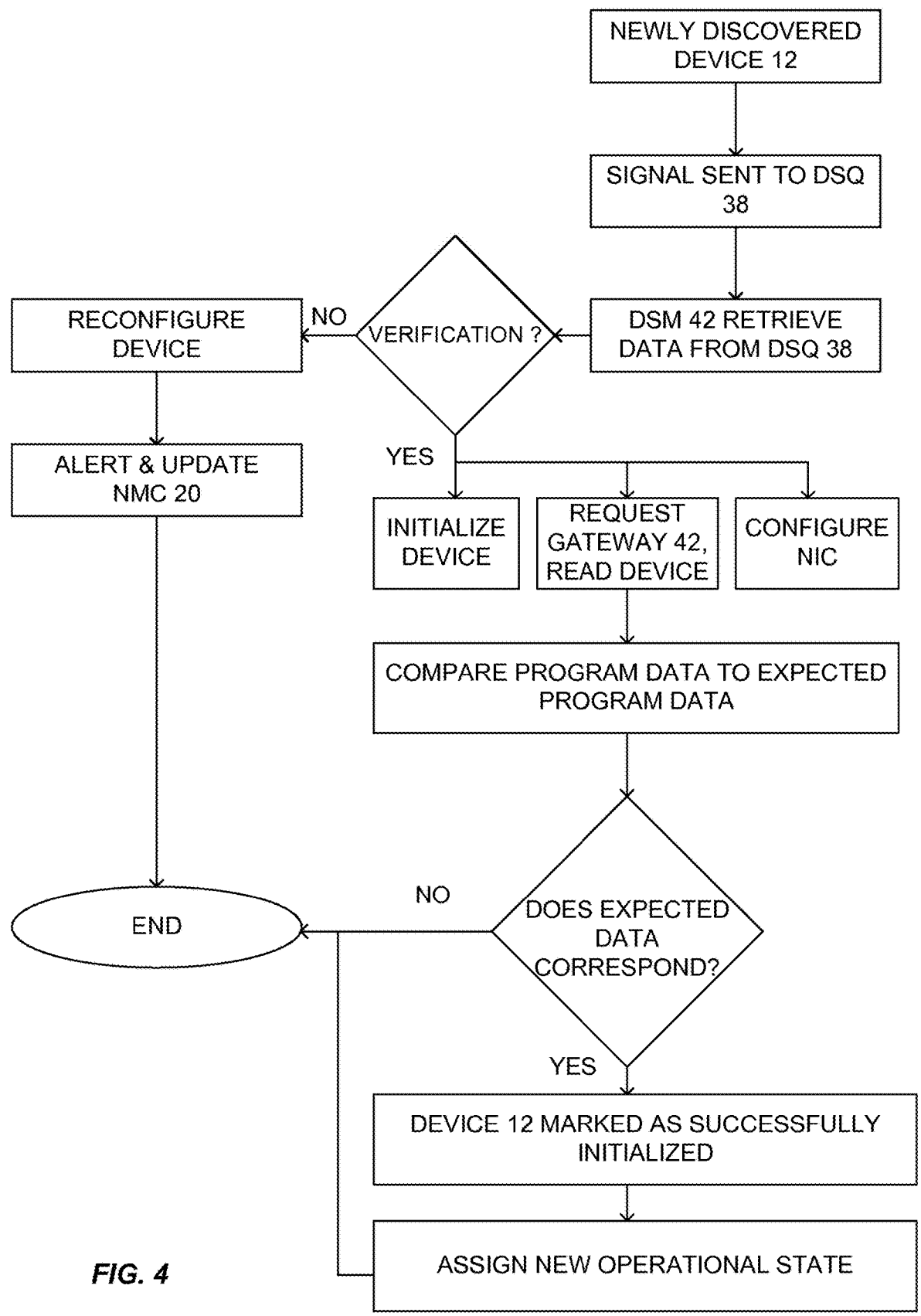

As shown in FIG. 4, if an electronic utility device 12 is added to the utility network management system 10 or if the NMC 10 receives data indicative of a previously unrecognized electronic utility device 12 (e.g., if the utility grid 16 is expanded to include a new electronic utility device 12), a signal is sent to the DSQ 38 indicating that the electronic utility device 12 is ready to be initialized. Alternatively or in addition, if a network infrastructure device 14 is added to the utility network management system 10 or the utility management system 10 receives data indicative of a previously unrecognized network infrastructure device 14, a signal is sent to the DSQ 38 indicating that the network infrastructure device 14 is ready to be initialized.

The device state monitor ("DSM") 42 of the utility NMC 20 can then retrieve data from the DSQ 38 and initialize the electronic utility device 12 or the network infrastructure device 14. During initialization, the DSM 42 can perform a configuration of a network interface card ("NIC") embedded in the electronic utility device 12 to upload settings appropriate for or specific to the network 28 (e.g. communication channels and/or timing settings). In some embodiments, NICs can be secured (via public or private keys) or connected to one or more electronic utility devices 12 and can provide two way communication between the electronic utility device(s) 12 and network infrastructure devices 14. The DSM 42 can then send a request to a gateway 26 to read the electronic utility device's 12 program data.

As shown in FIG. 4, the utility NMC 20 can compare newly uploaded program data to expected program data for the electronic utility device 12. In some embodiments, the expected program data can be driven by or can be a function of the service plan a customer has selected for the specific location. Alternatively or in addition, the expected program data can be driven by a function of expected consumption values based, at least in part, on prior use values for a specific location and/or based, at least in part, on expected consumption values for a particular time of year. If the uploaded program data corresponds to or matches the expected program data for the electronic utility device 12, the electronic utility device 12 is marked as having been successfully initialized. The FSM 34 can then assign a new operational state (i.e., active) to the electronic utility device 12. In this manner, subsequent meter reads will identify the newly activated electronic utility device 12, transmit data to the electronic utility device 12, receive data from the electronic utility device 12, and/or perform recurring activities to maintain the electronic utility device 12 within the utility grid 16. In some embodiments, the electronic utility devices 12 are addressed according to device type, device relative priority, device dependency (upstream and/or downstream), device cost, device relationship/association, device usage of a commodity, device maintenance cost, device ownership, device proximity, device location, etc.

Following initialization or at the same time, meter program data can be asynchronously uploaded from the utility NMC 20. In some embodiments, the utility NMC 20 can configure each device upon the device's initial discovery and/or provide mechanisms for updating configuration data over time.

Some or all electronic utility devices 12 or network infrastructure devices 14 added to the utility grid 16 require an initial verification and authentication to ensure that they are indeed part of the utility grid 16 and are configured in a manner consistent with the guidelines for operating the utility grid 16. If variances are discovered, reconfiguration of the electronic utility device 12 or network infrastructure device 14 is required, and the utility NMC 20 will be made aware of the variances and corrective actions are specified and implemented. A "meter program" is a collection of configuration options that specify what data an electronic utility device 12 is recording, the frequency with which it is recording the data, and the restriction rules the electronic utility device 12 is required to follow. The system described herein provides for managing both the network-level configurations required of some or all of the electronic utility devices 12 and/or network infrastructure devices 14 added to the utility grid 16, and the set of meter programs configured onto at least some of the electronic utility devices 12.

Automated management of the configuration of electronic utility devices 12 and/or network infrastructure devices 14 within the utility grid 16 is critical to making the entire provisioning process work. Indeed, the key aspects of provisioning are to configure electronic utility devices 12 and/or network infrastructure devices 14 upon the initial discovery of the electronic utility devices 12 and/or network infrastructure devices 14 and to provide mechanisms for updating that configuration over time.

In some embodiments, the NMC utility 20 can maintain three or more distinct fundamental types of configuration data for each of the electronic utility devices 12. For example, the utility NMC 20 can maintain network configurations related to the NIC embedded in each electronic utility device 12. The utility NMC 20 can also or alternatively maintain device-specific configurations ("meter programs") related to the electronic utility device 12 in which the NIC is embedded. The device-specific configuration data can be stored in the internal hardware of the electronic utility device 12. Alternatively, the device-specific configuration data can be stored in the NIC of the electronic utility device 12. In some embodiments, the utility NMC 20 can also or alternatively maintain network configurations for on-location devices connected to or operable with electronic utility devices 12. Such devices, including smart thermostats, smart pool pumps, and smart HVAC systems, allow the utility to address peak load situations by sending information to the device such that it can then act to adjust the load.

Figure 5:
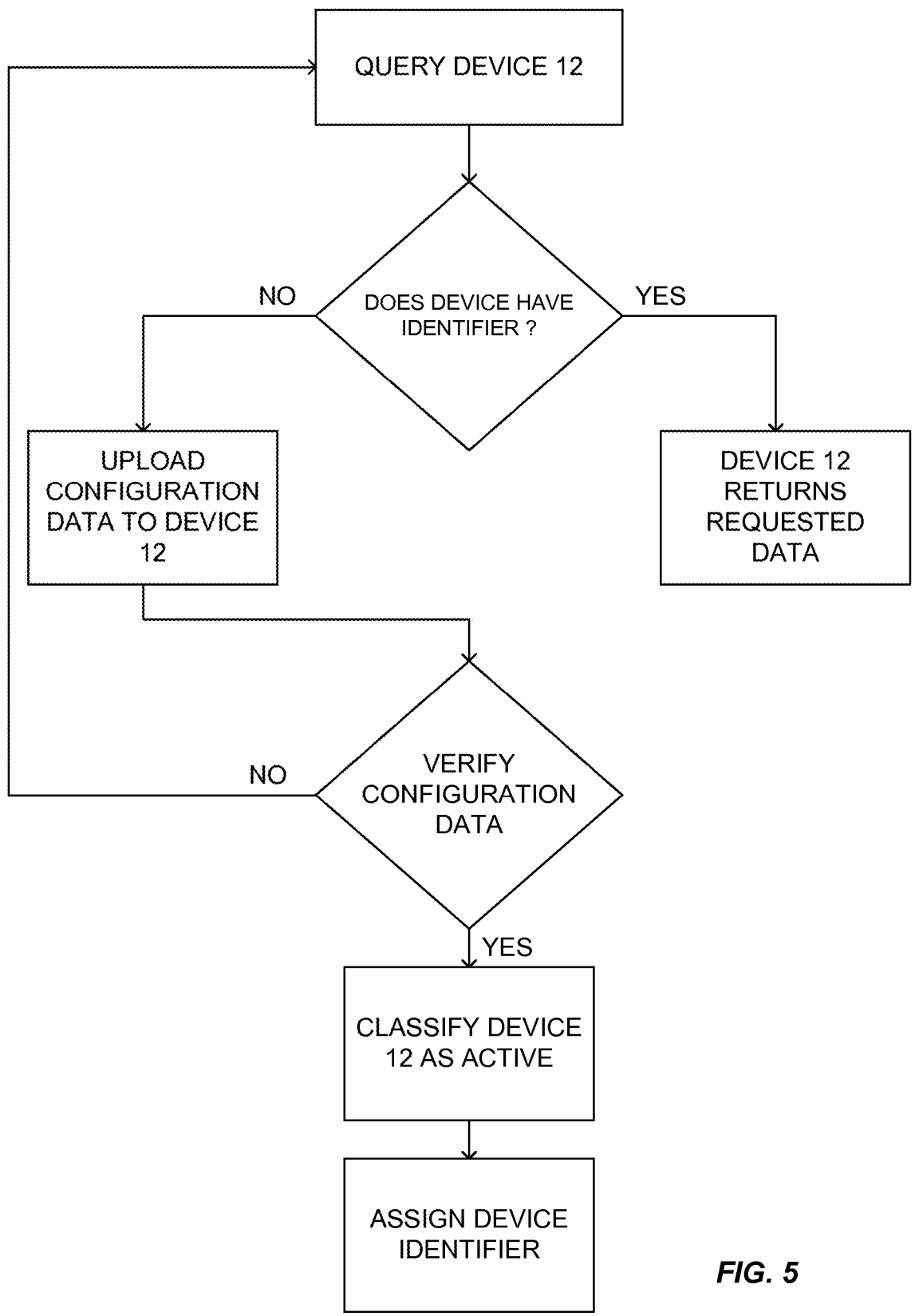

As shown in FIG. 5, for the network configuration portion of the process, attributes are downloaded to the electronic utility devices 12 based upon the meter type. If the meter type is not known at initialization or relatively soon after initialization, the NMC 20 queries the electronic utility device 12 for its type and capabilities. After determining the type and capability of the electronic utility device 12, the utility NMC 20 uploads the appropriate configuration data onto the electronic utility device 12. The process is deemed complete when the configuration data is verified either by retrieving the attributes that were configured or by performing one or more tests on the electronic utility device 12.

If the configuration data is not verified, the utility NMC 20 sends a status message to the electronic utility device 12. In some embodiments, a software update or configuration change can be included with the status message. If the integrity of the electronic utility device 12 is not verified in response to the status message, the utility NMC 20 can initiate an alert.

In some embodiments, the billing of a commodity, rent, usage, etc., that is to be associated with an electronic utility device 12 is recorded based on device type, meter type, meter capabilities, meter program, device relative priority, device dependency (upstream and/or downstream), device cost, device relationship/association, device usage of a commodity, device maintenance cost, device ownership, device proximity, device location, etc., will determine or be used by the utility NMC 20 to determine which customer data is recorded and the frequency with which customer data is recorded. For example, if a customer has subscribed to a Time-of-Use ("TOU") billing program where the customer pays less for utility service during off-peak hours but more for usage during peak hours, the electronic utility device 12 can be configured to record data in the correct TOU buckets, or alternatively, the electronic utility device 12 can be configured to record usage data with a frequency that meets or exceeds the requirements of the TOU buckets.

In some embodiments, an electronic utility device 12 can be associated with another device, customer, person, entity, account, etc. based upon the observed changes in a metered commodity. For example, the utility NMC 20 may be able to determine which customer is to be billed for the electrical usage of an electronic utility device 12 based upon a control signal which changes the electrical usage of the device, and monitoring to determine which customers' premise sees a change in their electrical usage during the application of the control signal. In some embodiments, electronic utility devices 12 may receive control messages that are configured to prevent the electronic utility devices 12 from being used or changed during the application of the control signal to prevent the expected change use from the application of the control signal from being masked by normal use. For example, electronic utility devices 12 may be told to not shut off, not start, or remain in a preferred state of operation (e.g., the device's previous sate, a new state, etc.). Additionally or alternatively, electronic utility devices 12 may be excluded from receiving the control signal or the application of the control signal may be postponed depending upon the operation (e.g., observed operation, scheduled operation, etc.) of one or more devices associated with the tested electronic utility device 12. For example, the application of the control signal may be postponed depending upon the importance of the electronic utility device 12, the dependence of other devices on the electronic utility device 12, the dependence of the electronic utility device on other devices, the attributes of the devices that depend on the electronic utility device, etc.

In some embodiments, a billing rule is applied to an electronic utility device 12 (e.g., a mobile device, a rechargeable vehicle, etc.) according to device type, meter type, meter capabilities, meter program, device relative priority, device dependency (upstream and/or downstream), device cost, device relationship/association, device usage of a commodity, device maintenance cost, device ownership, device proximity, device location, etc. The billing rule may group utility devices 12 or may associate billing of the utility device 12 with a person, entity, account, etc. For example, a rechargeable vehicle or mobile device that is connected to the utility NMC 20 can have an associated billing rule that charges a customer or account with the metered recharging, even if the rechargeable vehicle or mobile device is connected to a section of the utility grid that is associated with another customer or account for billing purposes.

The attributes of a meter program can be relatively large (multiple kilobytes), so it can be efficient not to transport those attributes throughout the network 28 each time an electronic utility device 12 or network infrastructure device 14 is added to the utility grid 16 but to instead create an identifier that can be communicated throughout the network 28. Network management software stored on the NIC can include a hashing algorithm for efficiently referencing a meter program, and this hash key or algorithm can be returned to the utility NMC 20 when the meter program is queried. In some embodiments, the electronic utility devices 12 can include two hash keys with one of the keys being used to reference data being recorded by the electronic utility device 12 (e.g., channels and units of measure, scale factors, etc.) and with the other hash key being used to reference the calendar that drives the collection of data by the electronic utility device 12. If the hash key is known to or recognized by the utility NMC 20, the utility NMC 20 will verify that the meter program matches what was configured to be on the electronic utility device 12, and if so, the meter program verification process is complete.

After an electronic utility device 12 is classified as "active" and/or after an electronic utility device 12 is initialized, the NMC 20 calculates a program seal and assigns the program seal to the electronic utility device 12. Thereafter, the program seal is verified when subsequent read requests are received by the electronic utility device 12. In some embodiments, the program seal can be a series of hexadecimal integers that is orders of magnitude smaller than the meter program data itself and does not change unless the electronic utility device 12 is reprogrammed. In these embodiments, the program seal is guaranteed to change if any aspect of the meter program that impacts data integrity or content is altered. This program seal is checked each time the electronic utility device 12 is accessed. If the program seal for a specific electronic utility device 12 is changed, any data read from the electronic utility device 12 since the change is discarded, and the electronic utility device 12 reenters the initialization process.

If, during read requests, a recognized program seal is received, the electronic utility device 12 returns requested data. If a recognized program seal is not received, the electronic utility device 12 is assumed to have been reprogrammed and the FSM 34 can activate the initialization process and/or can add an appropriate record to the DSQ 38. If an electronic utility device 12 is reprogrammed by the utility, either through the utility NMC 20 or out of band with respect to the utility NMC 20 and the AMR network, the utility network management system 10 will detect the change. Alternatively or in addition, if a recognized program seal is not received, the NMC 20 can initiate an alert and/or alter any billing rules associated with the electronic utility device 12.

The utility NMC 20 can provide an administrative interface to allow an operator to review the program, verify that it is valid, configure how data read by the electronic utility devices 12 using the program should be displayed to the operator, and provide an operator-visible name and description to the program prior to marking the meter program as approved. Subsequently, electronic utility devices 12 discovered with that program can flow through the normal initialization process without any manual intervention unless a mismatch or other error occurs.

If there is a mismatch between the program seal found on the electronic utility device 12 and the configuration expected by the utility NMC 20, another administrative screen is provided to allow such mismatches to be reviewed and resolved by an operator. Resolution can be as simple as updating the expected value in the utility NMC 20 to reflect what is actually on the electronic utility device 12, or it may involve reprogramming the electronic utility device 12 either over the network 28, or through an out-of-band process. In some embodiments, the NMC 20 can be operable to provide a software update to an electronic utility device 12 having an unexpected or incorrect program seal. In some such embodiments, the software update can include read software. In addition, the utility NMC 20 can be operable to record and/or store data associated with the verification and/or integrity of the program seals and readings of the program seals.

The utility management system 10 can ensure that a utility will not inadvertently deploy electronic utility devices 12 that are configured inappropriately and/or will not continue to have meters 12 deployed that are not properly configured. With these and other features and/or with the program seal functionality described below, the utility management system 10 can ensure the data expected to be recorded by each electronic utility device 12 is actually what is being recorded, eliminating the potential for fraud or errors that reduce revenue and create administrative havoc.

A program seal technique can be used to create a unique hexadecimal seal that clearly identifies and guarantees the type of operational functions (programs) loaded on to the electronic utility devices 12. The program seal can be verified each time the electronic utility device 12 is accessed for reading. In some such embodiments, the program seal can be changed each time the program is changed by the utility NMC 20. This technique assures the integrity of the data that the utility receives from each electronic utility device 12.

In addition to handling the initial configuration of electronic utility devices 12, there is the challenge of making changes to the configurations across all or a group of meters 12 managed by the utility. This capability is supported in utility NMC 20 through the functionality described above combined with the ability to modify the desired configuration for one or a set of electronic utility devices 12 (as defined by one or more device groups, described below). When a new configuration is identified, the configuration process is re-executed across all affected electronic utility devices 12, and exception-based status is provided for electronic utility devices 12 still undergoing re-configuration or where the re-configuration operation has failed.

Figure 6:
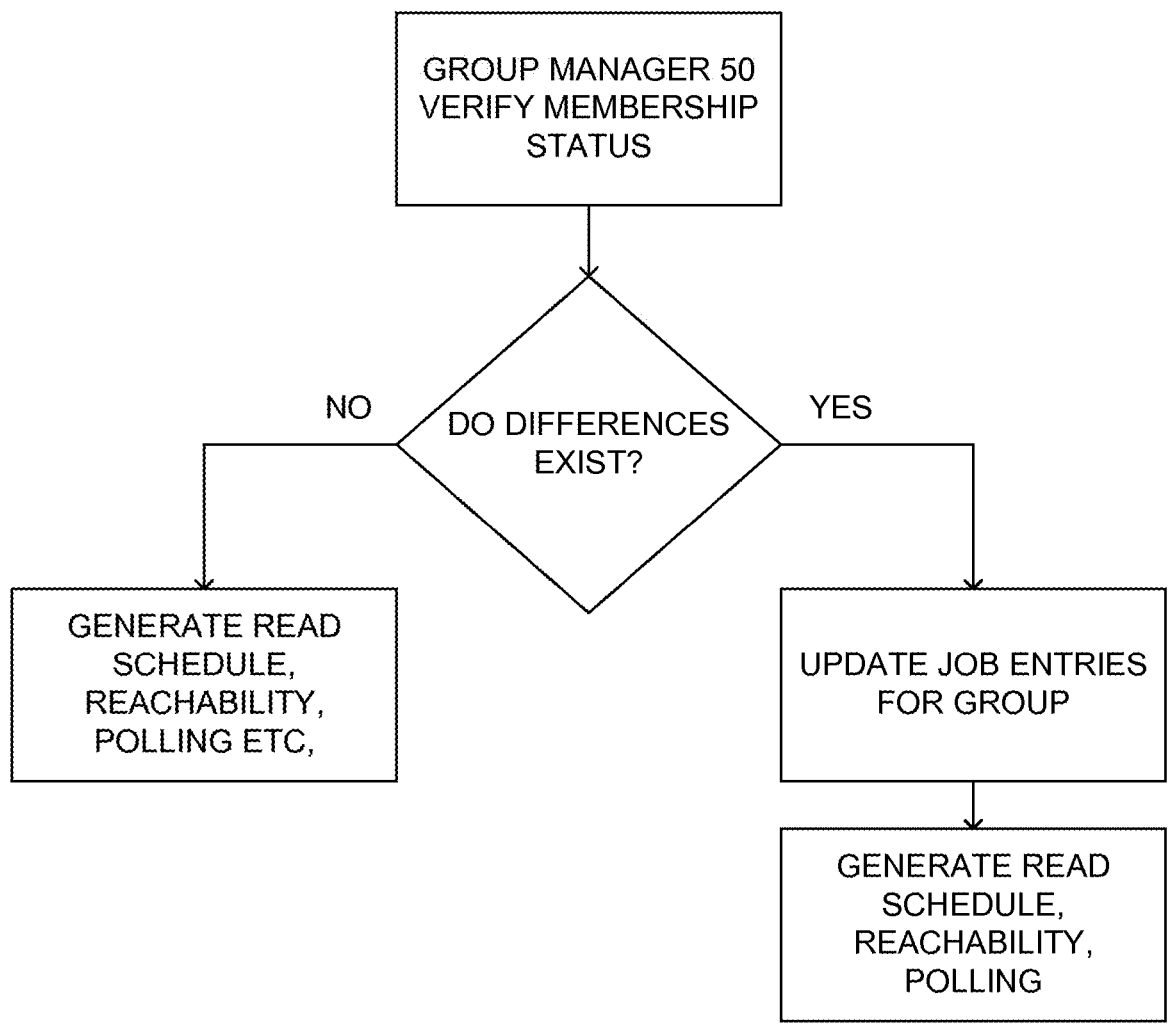

As shown in FIGS. 2 and 6, the utility network management system 10 can also include an NMC group manager 50, which can periodically (e.g., at regular or irregular predetermined intervals) recalculate and/or verify the membership status of one or more dynamic groups and/or one or more static groups within the utility grid 16, and, if differences are noted, the NMC group manager 50 can update some or all of the job entries that reference a specific dynamic group or a specific static group for determining the membership on that job entry. As used herein, the term "dynamic group" refers to a group of electronic utility devices 12 whose configuration and/or administrative or operational state can change randomly. As used herein, the term "static group" refers to a group of electronic utility devices 12 whose configuration and/or administrative or operational state remains constant over time. Job entries are used for determining meter read schedules (i.e., a listing of which electronic utility devices 12 are to be read, where the electronic utility devices 12 are located, a start time, and/or an optional end time or end date when the schedule executes), automatic reachability polling, data exports, and scheduling other recurring activities for the electronic utility devices 12 and/or the other network infrastructure devices 14 of the utility grid 16.

Device groups are used to opaquely identify a set of electronic utility devices 12 and/or network infrastructure devices 14. By "opaque", it is meant that the entity that accesses a group is not pre-programmed to include a specific set of members of the group nor even the number of members. Device groups are unlimited in size and can also be nested. A static group of electronic utility devices 12 and/or network infrastructure devices 14 is a predetermined group or set of two or more specifically enumerated and pre-selected electronic utility devices 12 and/or network infrastructure devices 14. Such static groups can be established based on type of device, geographic groupings of devices, and/or other common functionalities and these static groups are pre-established and pre-programmed into the NMC group manager 50.

As mentioned above, the NMC group manager 50 is also or alternatively operable to recalculate and/or verify the membership status of one or more dynamic groups. Dynamic groups of electronic utility devices 12 and/or network infrastructure devices 14 are based on specific attributes of the electronic utility devices 12 and/or network infrastructure devices 14 of the utility grid 16 (e.g., the type of device, the expected operational life of the device 14, etc.). As electronic utility devices 12 and/or network infrastructure devices 14 are added to the utility grid 16, or attributes of existing electronic utility devices 12 and/or network infrastructure devices 14 are modified, the NMC group manager 50 can automatically or periodically update the membership for each dynamic group, and all functions that reference the dynamic groups can also or alternatively be updated.

In some embodiments, each member of a static group is specifically enumerated and preloaded onto the NMC group manager 50. This approach is valuable when manually selecting devices that should be operated together as a group. As mentioned above, the NMC group manager 50 can also or alternatively update some or all of the job entries that reference a specific dynamic group. This is particularly advantageous because this approach is scalable and is operable without operator input or with only minimal operator input. For example, in some embodiments, the NMC group manager 50 can update lists of electronic utility devices 12 to be read or exported. This is particularly advantageous for utility grids 16 having hundreds or thousands of electronic utility devices 12 and/or other network infrastructure devices 14 which are updated each day. For example, a utility with 1 million meters deployed that has 10% of its customer base moving annually will experience 100,000 service deactivations and reactivations annually, which correspond to 800 meter changes each business day.

Specifically, read schedules can be updated and redeployed to reflect new or removed members, and export jobs will use the latest membership when they next execute. Granularity of this update frequency can be made large or small depending upon the business and operational requirements of the utility company. The benefit to the utility can be enormous. The utility company can simply define the business operations that they want to perform on each logical group, define the attributes of each group, and then let the system run. As new business needs are identified, new dynamic groups can be created, or outdated ones can be retired, all with minimal operator input.

The utility network management system 10 can include a reliable and rapid network-based system for remote configuration and reconfiguration of electronic utility devices 12 and/or network infrastructure devices 14, along with the features to dynamically load and change programs that set the type, frequency, etc. of data collected, stored, and/or reported by the electronic utility devices 12 and/or network infrastructure devices 14.

The utility network management system 10 can include a dynamic technique of grouping a large family of devices into "dynamic groups" based on their functionalities, types of programs resident in the electronic utility devices 12 at any point in time, and other utility-defined attributes, and methods for constantly updating the groups to reflect the latest status of each device in the utility grid 16.

Dynamic groups can also be nested to provide the utility with the ability to address unique groups of devices for some functions, while at other times the ability to perform an action on the aggregate set of groups without having to maintain knowledge within the aggregate action of all of the distinct groups. For example, the following is a sample device group ontology.

1. Active Network Devices
   a. Active Gateways
   b. Active Relays
   c. Active Electronic Utility Devices
     i. Active Commercial & Industrial meters
     ii. Active Residential meters
        1. Active Flat-Rate Electronic Utility Devices
        2. Active Time-of-Use Electronic Utility Devices A utility may need to perform one or more of the following discrete actions on one or more of these groups: weekly security report that analyzes events generate by all active network devices (1), daily data export for data collected from active meters (1.b), during business hours, hourly data export from active commercial and industrial meters (1.c.i), and re-configure active Time-of-Use Meters (1.a.i.2) to reflect new rate structure effective on a specific date (e.g., June 1).

Figure 7:
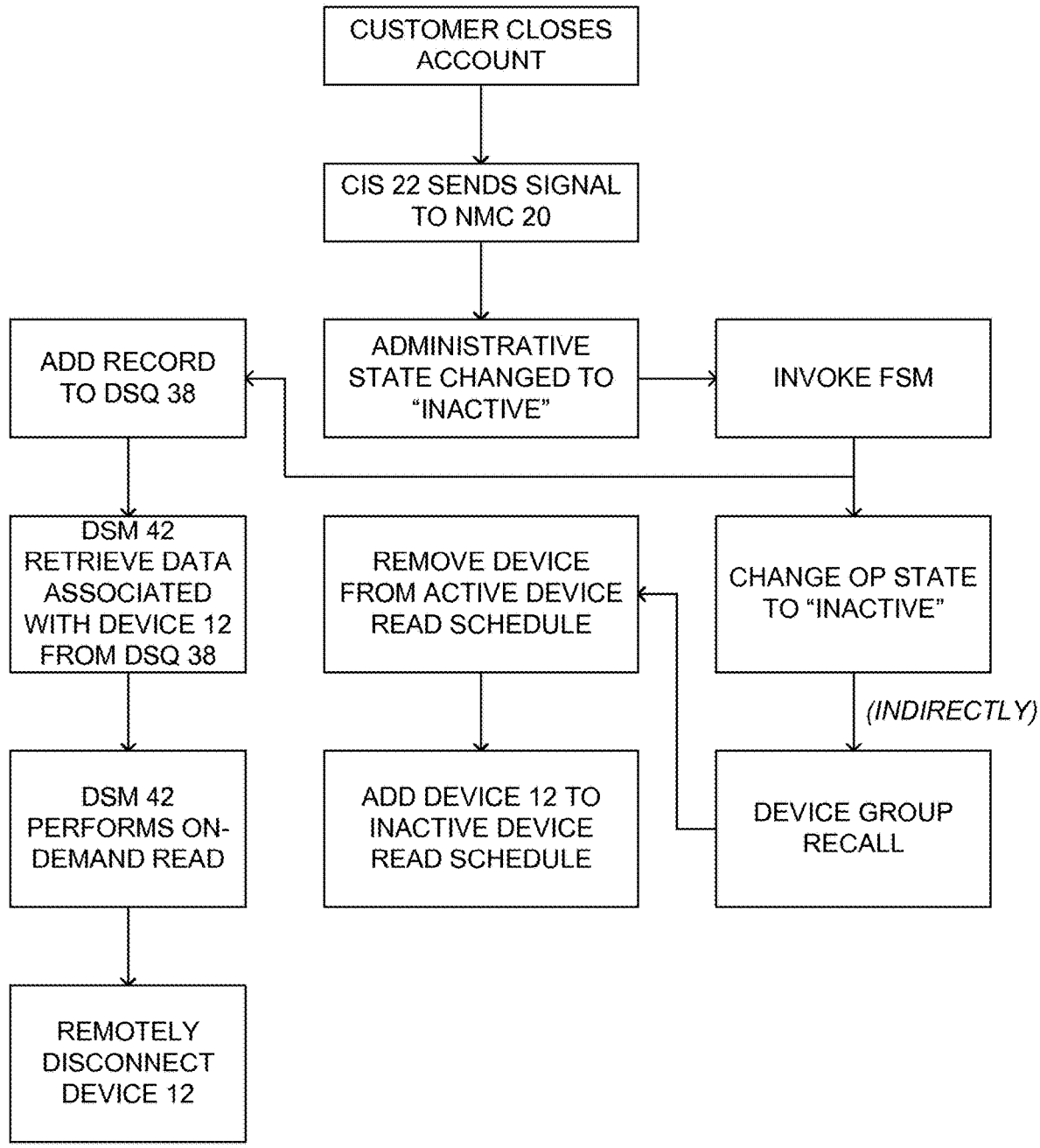
Figure 8:
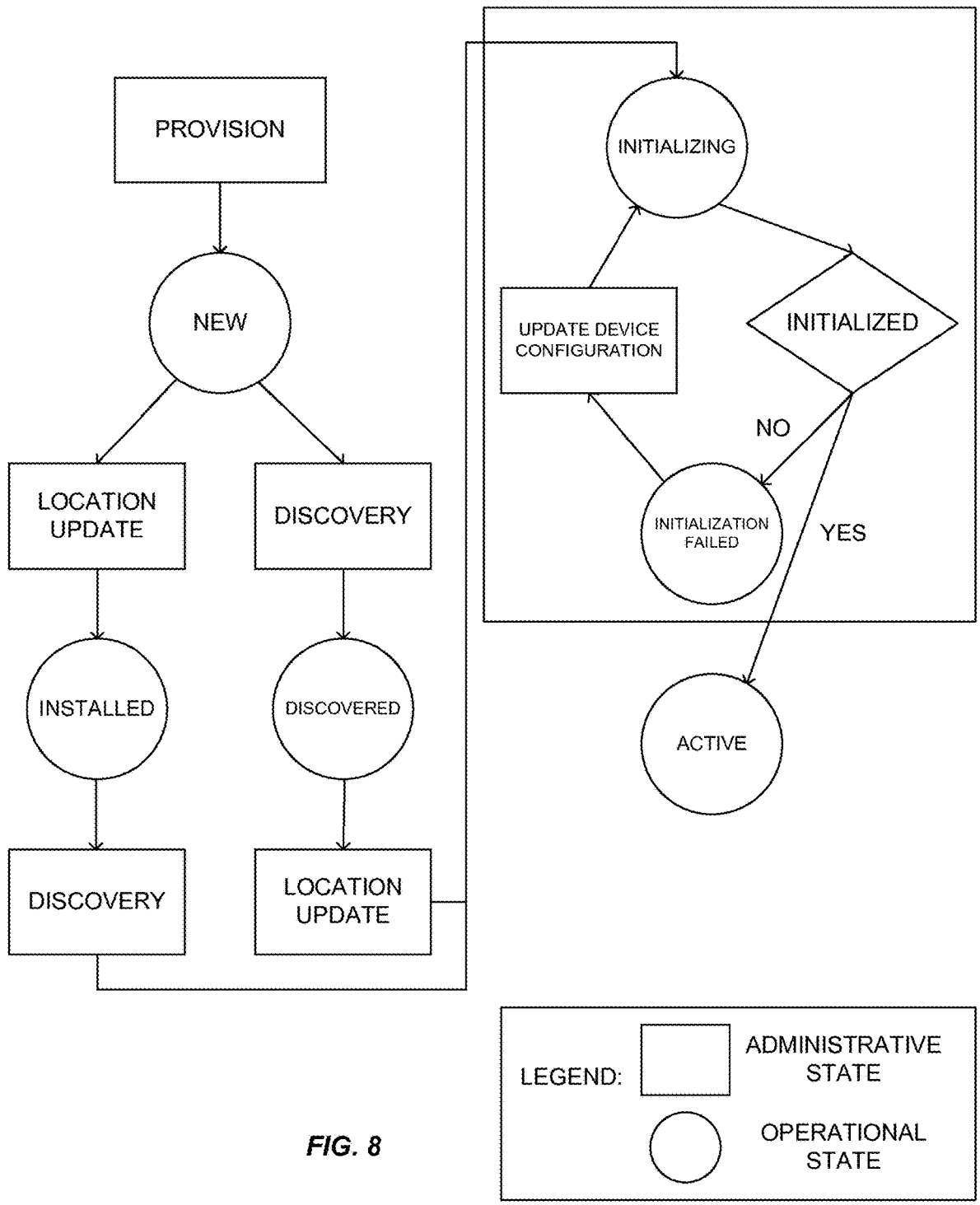
Figure 9:
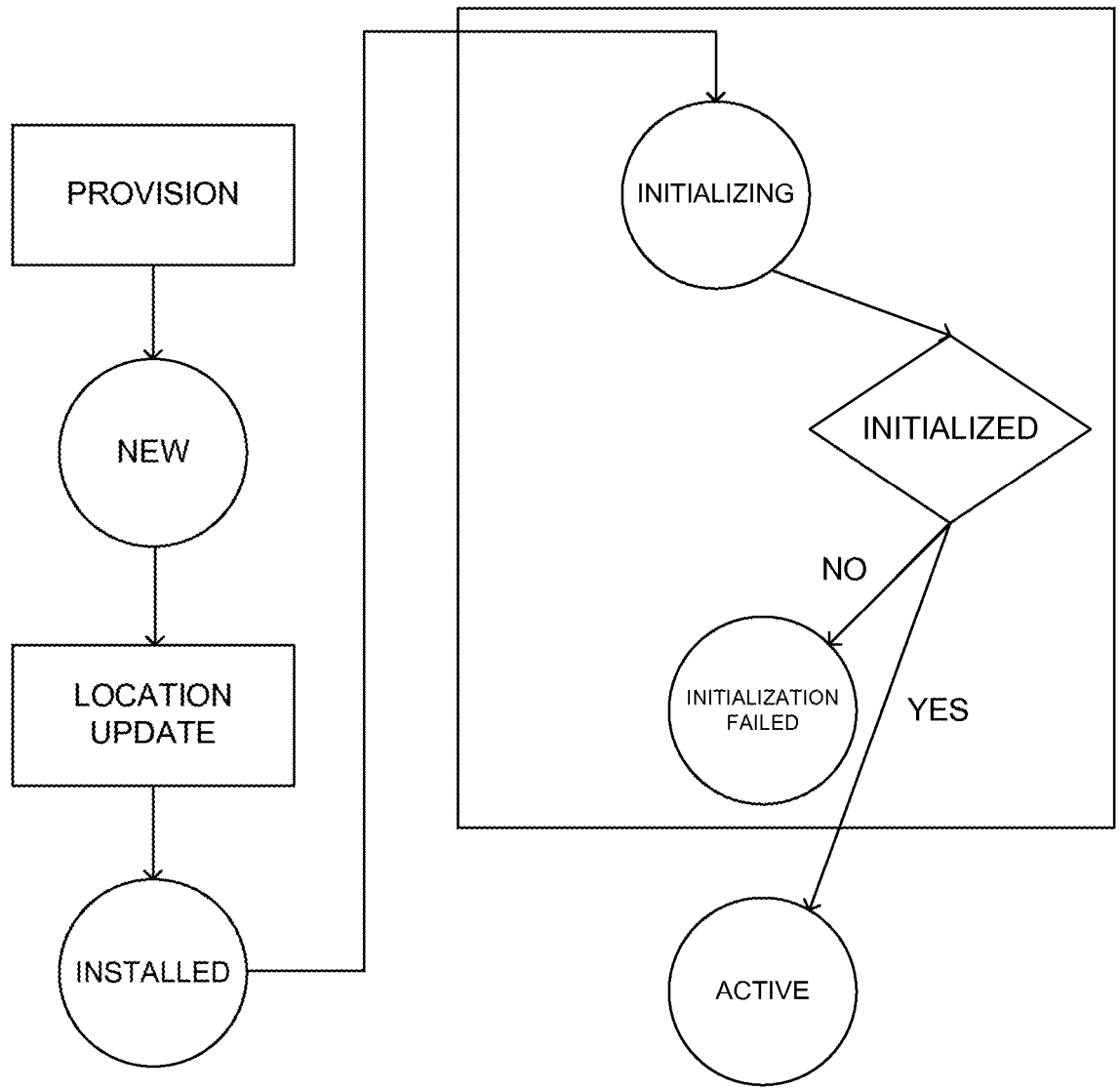
Figure 9:
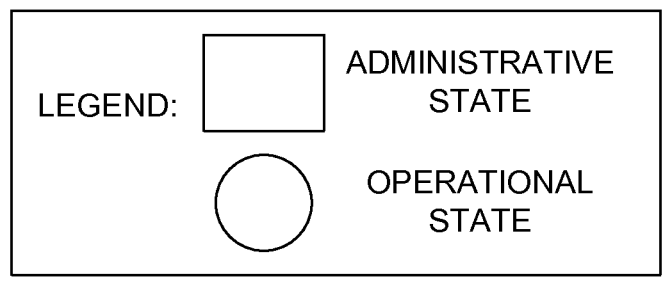

As shown in FIG. 7, when a customer account is closed (e.g., because the customer has moved or changed utility service providers), the CIS 22 sends a signal to the utility NMC 20 indicating that the account has been closed and changing the administrate state of the electronic utility device 12 to inactive. The CIS 22 can also or alternatively transmit a signal to the FSM 34 changing the operational state of the electronic utility device 12 to inactive. In some embodiments, the CIS 22 also adds a record to the DSQ 38 to indicate that appropriate action must be taken as a result of this state change. Alternatively or in addition, the FSM 34 can add a record to the DSQ 38 to indicate that appropriate action must be taken as a result of this state change.

The DSM 42 can retrieve the data associated with the electronic utility device 12 from the DSQ 38 and performs one or more actions associated with the newly changed state of the electronic utility device 12. For example, the DSM 42 can perform an on-demand read for a meter that has been redesignated from active to inactive, indicating that service has been turned off. The DSM 42 can also or alternatively send a signal to remotely disconnect one or more electronic utility devices 12.

In some embodiments, the utility NMC 20 can be operable to perform automated membership updates for some or all of the electronic utility devices 12 in the utility grid 16. In these embodiments, when the administrative state of an electronic utility device 12 is changed from active to inactive, the utility NMC 20 can remove that electronic utility device 12 from an "active meter read" schedule and can add that electronic utility device 12 to an "inactive meter read"

schedule, which can be run less frequently in order to reduce the burden on the network 28. In some embodiments, when the administrative state of an electronic utility device 12 is changed from active to inactive, the electronic utility device 12 is also added to a periodic (e.g., daily, weekly, bi-weekly, monthly, etc.) security report, which is established to locate abnormal usage patterns indicative of theft or system failure.

The embodiments presented herein combine sub-systems and functionality to illustrate the presently preferred embodiments. Alternative embodiments may include fewer sub-systems, processes, or functional aspects, or may be used with other sub-systems, processes, or functional aspects depending upon the desired implementation.

Any and all combinations of any of the claim elements recited in any of the claims and/or any elements described in this application, in any fashion, fall within the contemplated scope of the present invention and protection.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    receiving, by a server and from a rechargeable vehicle, data indicating a meter program being used by the rechargeable vehicle, wherein the meter program comprises a collection of configuration options that specify one or more of what data the rechargeable vehicle is recording, a frequency with which the rechargeable vehicle is recording the data, or restriction rules the rechargeable vehicle is required to follow;
    determining, by the server, that the received data indicating the meter program matches data indicating an expected meter program for the rechargeable vehicle; and
    assigning, by the server, an active state to the rechargeable vehicle based on the determining; and
    distributing, by the server, an amount of a commodity to the rechargeable vehicle via a utility grid.

2. The method of claim 1, wherein the data indicating the expected meter program is determined based on a location of the rechargeable vehicle.

3. The method of claim 2, wherein the data indicating the expected meter program is determined based on prior consumption of the commodity by the rechargeable vehicle at the location.

4. The method of claim 1, wherein the data indicating the expected meter program is determined based on prior consumption of the commodity by the rechargeable vehicle at a specific time of year.

5. The method of claim 1, wherein the received data indicating the meter program is the meter program, a hash of the meter program, or a program seal for the rechargeable vehicle.

6. The method of claim 1, further comprising configuring, by the server, the rechargeable vehicle to comply with infrastructure guidelines for the utility grid.

7. The method of claim 1, further comprising determining, by the server, a location of the rechargeable vehicle.

8. The method of claim 1, further comprising discovering, by the server, that the rechargeable vehicle is connected to the utility grid before receiving the data indicating the meter program from the rechargeable vehicle.

9. The method of claim 1, further comprising:
    determining, by the server, the amount of the commodity distributed to the rechargeable vehicle; and
    billing, by the server, a customer associated with the rechargeable vehicle based on the amount of the commodity distributed to the rechargeable vehicle.

10. The method of claim 1, wherein the meter program indicates that commodity consumption should be recorded based on a location of the rechargeable vehicle.

11. The method of claim 1, wherein the meter program indicates that commodity consumption should be recorded at a first frequency.

12. A system comprising:
    a processor; and
    a computer-readable medium storing software that, when executed by the processor, cause the processor to perform operations comprising:
        detecting that a rechargeable vehicle is connected to a utility network being managed by the system;
        receiving, from the rechargeable vehicle, information identifying program data being used by the rechargeable vehicle, wherein the program data comprises a collection of configuration options that specify one or more of what data the rechargeable vehicle is recording, a frequency with which the rechargeable vehicle is recording the data, or restriction rules the rechargeable vehicle is required to follow;
        determining that the received data identifying the program data matches data identifying expected program data for the rechargeable vehicle; and
        changing, based on the determining, an operational state of the rechargeable vehicle to active; and
        distributing an amount of a commodity to the rechargeable vehicle using the utility network.

13. The system of claim 12, wherein the data identifying the expected program data is determined based on prior consumption of the commodity by the rechargeable vehicle at a location of the rechargeable vehicle.

14. The system of claim 12, wherein the data identifying the expected program data is determined based on prior consumption of the commodity by the rechargeable vehicle at a specific time of year.

15. The system of claim 12, wherein the received data identifying the program data is the program data, a hash of the program data, or a program seal for the rechargeable vehicle.

16. The system of claim 12, wherein the operations further comprise configuring the rechargeable vehicle to comply with infrastructure guidelines for the utility network.

17. The system of claim 12, wherein the operations further comprise determining a location of the rechargeable vehicle.

18. The system of claim 12, wherein the operations further comprise:
    determining the amount of the commodity distributed to the rechargeable vehicle; and
    billing a customer associated with the rechargeable vehicle based on the amount of the commodity distributed to the rechargeable vehicle.

19. The system of claim 12, wherein the program data indicates that commodity usage by the rechargeable vehicle should be recorded based on a location of the rechargeable vehicle.

20. A non-transitory machine-readable medium storing software which, when executed by a processor of a server, cause the processor to perform operations comprising:
    receiving, from a rechargeable vehicle, data indicating a meter program being used by the rechargeable vehicle, wherein the meter program comprises a collection of configuration options that specify one or more of what data the rechargeable vehicle is recording, a frequency with which the rechargeable vehicle is recording the data, or restriction rules the rechargeable vehicle is required to follow;
determining that the received data indicating the meter program matches data indicating an expected meter program for the rechargeable vehicle; and
assigning an active state to the rechargeable vehicle based on the determining; and distributing an amount of a commodity to the rechargeable vehicle via a utility grid.

* * * * *